United States Patent [19]
Jespersen et al.

[11] 3,727,386
[45] Apr. 17, 1973

[54] FLEXIBLE REAR SHIELD FOR ROTARY LAWN MOWER

[75] Inventors: Herbert A. Jespersen; Earl H. Kidd, both of Galesburg, Ill.

[73] Assignee: Outboard Marine Corporation, Waukegan, Ill.

[22] Filed: June 6, 1972

[21] Appl. No.: 260,128

[52] U.S. Cl. ................................56/320.1, 56/17.4
[51] Int. Cl. ........................A01d 67/00, A01d 35/12
[58] Field of Search..........................56/320.1, 320.2, 56/255, 17.5, 17.4, 17.2, 12.9, 10.5; 280/154.5 R, 152.5 R

[56] References Cited

UNITED STATES PATENTS

| | | | |
|---|---|---|---|
| 2,514,407 | 7/1950 | May | 56/17.4 |
| 2,659,191 | 11/1953 | Miller et al. | 56/12.9 |
| 2,692,466 | 10/1954 | Brunts et al. | 56/320.1 |
| 3,040,503 | 6/1962 | Ogle, Jr. | 56/17.4 |
| 3,057,643 | 10/1962 | Eberwine | 280/154.5 R |
| 3,190,061 | 6/1965 | Gilbertson | 56/10.5 |
| 3,226,920 | 1/1966 | Gilbertson | 56/255 |
| 3,378,995 | 4/1968 | Welsh | 56/320.1 |
| 3,524,307 | 8/1970 | Dahl | 56/17.4 |
| 3,555,793 | 1/1971 | Chapman | 56/17.4 |
| 3,577,871 | 5/1971 | Engler | 56/255 |

*Primary Examiner*—Russell R. Kinsey
*Attorney*—Robert E. Clemency et al.

[57] ABSTRACT

Disclosed herein is a rotary lawn mower comprising a blade housing including a top deck, a generally annular wall depending from the top deck and substantially enclosing a cutter blade, and a rear wall depending from the top deck, extending generally transversely of the direction of intended travel, and spaced rearwardly from the annular wall. Also disclosed is pivot means supported by the blade housing and having a transversely extending axis adjacent to the rear wall, and a flexible shield carried by the pivot means for pivotal movement about said axis, extending across substantially the entire distance between the rear wheels supporting the blade housing, and extending in closely adjacent relation to the ground, not withstanding variation in the vertical distance of the blade housing above the ground. Also disclosed is spring means extending forwardly and rearwardly of the shield for yieldably limiting movement of an upper portion of the shield from a position adapted to locate a lower portion of the shield in closely adjacent relation to the ground.

7 Claims, 5 Drawing Figures

PATENTED APR 17 1973 3,727,386
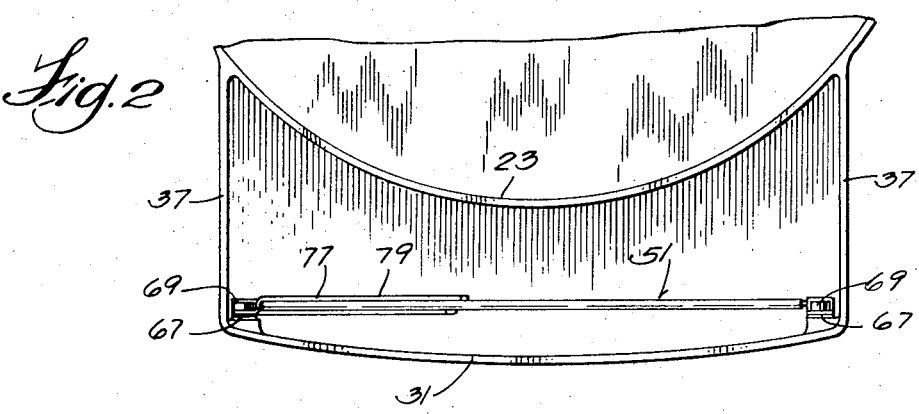
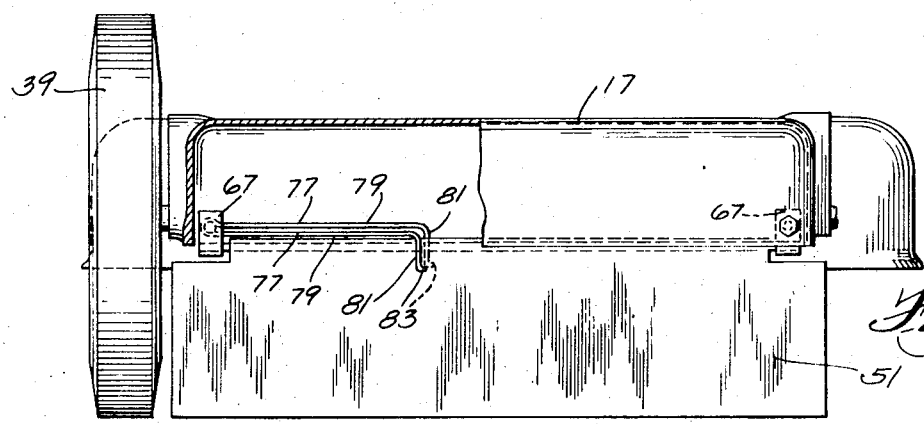
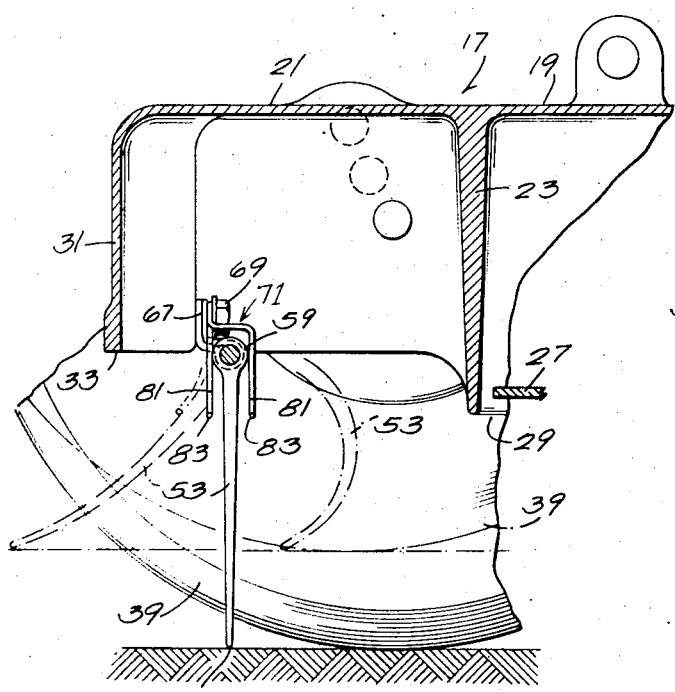
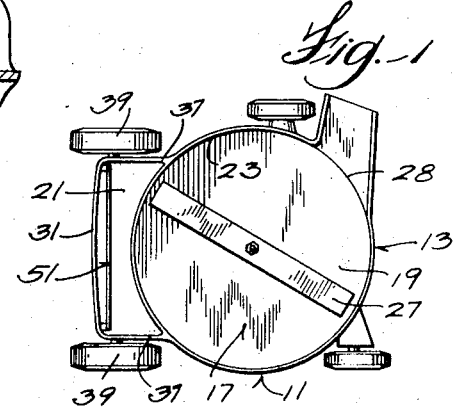
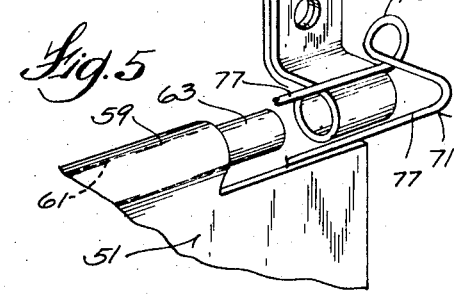

FLEXIBLE REAR SHIELD FOR ROTARY LAWN MOWER

BACKGROUND OF INVENTION

The invention relates generally to rotary lawn mowers and more particularly to rotary lawn mowers designed to prevent high velocity discharge of particles rearwardly from the mower. Examples of prior constructions are found in the U.S. McDonagh Pat. No. 3,106,812 issued Oct. 15, 1963; in the U.S. Gilbertson Pat. No. 3,190,061 issued June 22, 1965; in the U.S. Miskiewicz Pat. No. 3,212,245 issued Oct. 19, 1965; in the U.S. Nelson Pat. No. 3,402,535 issued Sept. 24, 1968; in the U.S. Groll Pat. No. 3,432,183 issued Mar. 11, 1969; in the U.S. Miskiewicz Pat. No. 3,570,225 issued Mar. 16, 1971; and in the U.S. Dahl Pat. No. 3,577,714 issued May 4, 1971.

More particularly, the invention relates to rotary lawn mowers having a blade housing including a top deck and a generally annular and vertically extending, substantially continuous, wall depending from the top deck and substantially enclosing the cutter blade, together with a vertically extending rear wall which also depends from the top deck, which extends transversely of the direction of intended travel, and which is spaced rearwardly from the annular wall.

SUMMARY OF THE INVENTION

The invention provides a flexible shield which is pivotly mounted adjacent to a transversely extending blade housing rear wall located behind an annular cutter blade enclosing wall, which extends across substantially the entire width of the lawn mower and between a pair of ground engaging wheels supporting the rearward portion of the lawn mower, and which is preferably provided with means for yieldably biasing or urging the shield into a position engaging the ground or stubble so as to effectively block rearward discharge of particles at high velocity, not withstanding variation in the height of the lawn mower housing above the ground.

One of the principal objects of the invention is the provision of a flexible shield which is located between the rear wheels and extends substantially across the entire width of the lawn mower and which is effective to protect the operator from injury from objects thrown from under the housing at the rear of the mower.

Still another of the objects of the invention is the provision of means for yieldably limiting movement of such a shield away from a position adapted to locate a lower portion of the shield in closely adjacent relation to the ground.

Another of the principal objects of the invention is provision of a flexible shield which can be maintained, without special adjustment, in effective blocking position at the rear of the lawn mower regardless of the height of the blade housing above the ground.

Another of the principal objects of the invention is the provision of a rotary lawn mower including, at the rearward end thereof, a flexible shield which does not introduce hazardous situations under certain mowing conditions.

Still another object of the invention is the provision of a shield which is effective while, at the same time, is simple in design, and low in cost.

Other objects and advantages of the invention will become known by reference to the following description and the accompanying drawings.

THE DRAWINGS

FIG. 1 is a bottom view of a lawn mower embodying various of the features of the invention.

FIG. 2 is an enlarged bottom view of a portion of the lawn mower shown in FIG. 1.

FIG. 3 is an enlarged fragmentary rear view, partially in section, of the lawn mower shown in FIG. 1.

FIG. 4 is an enlarged fragmentary side view, partially in section, of a portion of the lawn mower shown in FIG. 1 and also showing, in dotted outline, the location of various of the components when the housing is lowered with respect to the ground.

FIG. 5 is an exploded view of various of the components of the lawn mower shown in FIG. 1.

Before explaining the invention in detail, it is to be understood that the invention is not limited in its application to the details of construction and arrangement of parts set forth in the following general description or illustrated in the accompanying drawings, since the invention is capable of othe embodiments and of being practiced or carried out in various ways. Also, it is to be understood that the phraseology or terminology employed herein is for the purpose of description and not of limitation.

GENERAL DESCRIPTION

Shown in the drawings is a rotary lawn mower 11 which embodies various of the features of the invention and which includes a blade housing 13 having a horizontally extending top deck 17 with a central portion 19 and with an extension or rear portion 21 extending rearwardly from the central portion. Depending from the top deck 17 is a generally annular, vertically extending, substantially continuous wall 23 which generally encloses or surrounds the path of the periphery of the cutter blade 27, and which can include one or more discharge openings 28, and which has (See FIG. 4) a lower edge 29 located adjacent to or slightly below the plane of rotation of the cutter blade 27.

Depending from the rear margin of the rear portion 21 of the top deck 17 is a vertically extending rear wall 31 having a lower edge 33 which can be located above the lower edge 29 of the annular wall 23.

Depending from the side margins of the rear portion 21 of the top deck 17 are vertically extending side wall segments 37 which connect the laterally outward margins of the rear wall 31 to the annular wall 23.

The blade housing 13 is suitably supported by three or more ground engaging wheels including two transversely spaced rear wheels 39 mounted for rotation adjacent to the side wall segments 37 and about axes located forwardly of the rear wall 31. Means can also be provided for vertically adjusting the relationship of the wheels to the blade housing 13 so as to vary the height of the grass being cut. Any suitable arrangement can be employed. An example of one such arrangement is disclosed in the U.S. Shaw Pat. No. 2,947,132 issued Aug. 2, 1960. Such variation in the height of cut involves selective vertical positioning of the blade housing 13 relative to the ground.

In accordance with the invention, there is provided a flexible shield 51 which is mounted for pivotal movement about an axis extending transversely of the direction of intended travel and adjacent to the lower edge 33 of the rear wall 31. While other flexible materials can be employed, it is preferred to form the shield 51 out of a vinyl plastic material which is of light weight as well as being tough and flexible.

The shield 51 includes a main portion 53 which is generally flat when untensioned, and which has a relatively thin thickness, and which tapers to a relative thin lower edge 57. In addition, the shield 51 has a width so that, when mounted on the blade housing 13, it extends substantially across the whole transverse distance between the rear wheels 39. Still further, the shield 51 is dimensioned such that, when the blade housing 13 is located in the uppermost position, the lower edge 57 of the shield 51 will be at least closely adjacent to the ground and preferably will be in engagement with the ground.

As indicated, means are provided for supporting the shield 51 solely by the lawn mower 11 and including means for pivotly mounting the shield 51 for movement about a transversely extending axis located adjacent to the lower edge 33 of the rear wall 31, and so that the shield extends between the rear wheels 39 for substantially the entire distance therebetween. While other arrangements could be employed, in the illustrated construction, a central part 59 of the upper margin of the shield 51 is slightly enlarged to accommodate a lengthwise bore 61 which receives a pivot pin or rod 63 supported, at each end, by respective hangers 67 which can be made of wire or sheet metal and which are suitably supported from the blade housing 13, and preferably from the rear wall 31. Various means can be employed to attach the hangers 67 to the blade housing 13. In the illustrated construction, each hanger 67 is bolted to the inside of the rear wall 31 by respective bolts 69. Transverse movement of the pivot rod 63 is limited by engagement of the pivot rod ends with the blade housing side wall segments 37. The height of the shield 51 and the location of the shield mounting are such as to prevent contact between the shield 51 and the cutter blade 27.

While the weight of the shield 51 can be relied upon to locate the shield 51 in engagement with the ground to thereby block high velocity particle discharge, in further accordance with the invention, it is preferred to additionally provide means for yieldably urging an upper part of the shield 51 toward a generally vertically extending position as as to more or less assure location of the shield 51 in blocking relation to any particle which might be thrown at high velocity by the cutting blade 27 past the lower edge 29 of the annular wall 23. In other words, such yieldable means serves to yieldably limit movement of an upper part of the shield 51 from a position adapted to locate a lower part of the shield 51 in closely adjacent relation to the ground. While various biasing arrangements can be employed, in the illustrated construction, there is employed a wire spring 71 which includes a bite 73 secured by one of the bolts 69 to the blade housing 13, and which further includes two parallel L shaped end portions 77, located in spaced fore and aft relation to each other and with the upper part of the shield 51 located there between.

Each such end portion 77 including a horizontal leg 79 and a leg 81 extending vertically from the outer end of the horizontal leg 79 and located centrally between the transverse ends of the shield 51. In addition, each of the vertically extending legs 81 can include a terminal portion or part 83 which is bent horizontally to provide increased bearing surface against the shield 51.

The L shaped end portions 77 are spaced from each other in the fore and aft direction with the shield 51 located there between, and the vertical legs 81 extend downwardly such distance so as to freely allow slight swinging of the shield 51 from a vertical position before engagement of the shield with one of the L shaped end portions 77. Such engagement not only serves to yieldably limit shield movement away from the vertical position, but also serves to urge the lower part or edge of the shield against the ground or stubble to further reduce any possibility of high velocity escape of solid particles regardless of the height adjustment of the blade housing 13 above the ground. If desired, more than one spring can be employed.

In operation, the shield 51 depends from its mounting, rearwardly of the annular wall 23 and between the rear wheels 39, in effect constituting an extension of the rear wall 31, and in posiion to blunt the rearward travel of any particle thrown at high velocity under the lower edge 29 of the annular wall 23 by the cutter blade 27. Because of the flexibility of the shield 51, as well as the biasing action of the spring 71, the shield 51 will act as an effective barrier regardless of the height of the blade housing 13 above the ground. In addition, location of the shield 51 between the rear wheels 39 serves to reduce the possiblity of possible escape between the lateral ends of the shield 51 and the rear wheels 39.

The flexibility of the shield 51 is especially advantageous as it permits accommodation by the shield 51 to various vertical locations of the blade housing 13 relative to the ground, as it permits passage of the shield 51 over obstacles, such as tree roots and the like, and because such flexibility permits folding or rolling of the shield 51 under the rear wall 31 in such manner as to permit reversal of the direction of movement of the blade housing 13, while maintaining an effective barrier to high velocity solid particle discharge.

Various other features of the invention are set forth in the following claims.

We claim:

1. A lawn mower comprising a blade housing including a top deck, a generally annular wall depending from said top deck, having a lower edge, and substantially enclosing a cutter blade, a rear wall depending from said top deck, extending generally transversely of the direction of intended travel, spaced rearwardly from said annular wall, and having a lower edge, means including a pair of transversely spaced rear wheels for supporting said blade housing for travel along the ground, said blade housing supporting means including means for selectively vertically locating said blade housing relative to the ground, pivot means supported by said blade housing and having a transversely extending axis adjacent to said rear wall and, a flexible shield carried by said pivot means for pivotal movement about said axis, extending across substantially the entire distance between said rear wheels and, when said blade housing is located by said blade housing locating means in its uppermost position relative to the ground, extending substantially vertically downwardly to at least closely adjacent relation to the ground.

2. A lawn mower in accordance with claim 1 and further including spring means, supported on said housing, and extending forwardly and rearwardly of said shield for yieldably limiting movement of an upper portion of said shield from a position adapted to locate a lower portion of said shield in closely adjacent relation to the ground.

3. A lawn mower in accordance with claim 2 wherein said spring means includes two vertically extending spring end portions spaced in the fore and aft direction with said shield being located there between.

4. A lawn mower in accordance with claim 3 wherein each said spring end portion includes a horizontally extending part adjacent the lower end thereof.

5. A lawn mower in accordance with claim 1 wherein said shield includes a portion which is generally flat when untensioned, and which has a relatively thin thickness.

6. A lawn mower in accordance with claim 5 wherein said portion tapers to a relative thin lower edge.

7. A lawn mower in accordance with claim 1 wherein said shield is supported from said blade housing solely by said pivot means and has a relatively thin lower part with a relatively thin lower edge.

* * * * *